United States Patent Office 2,895,498
Patented July 21, 1959

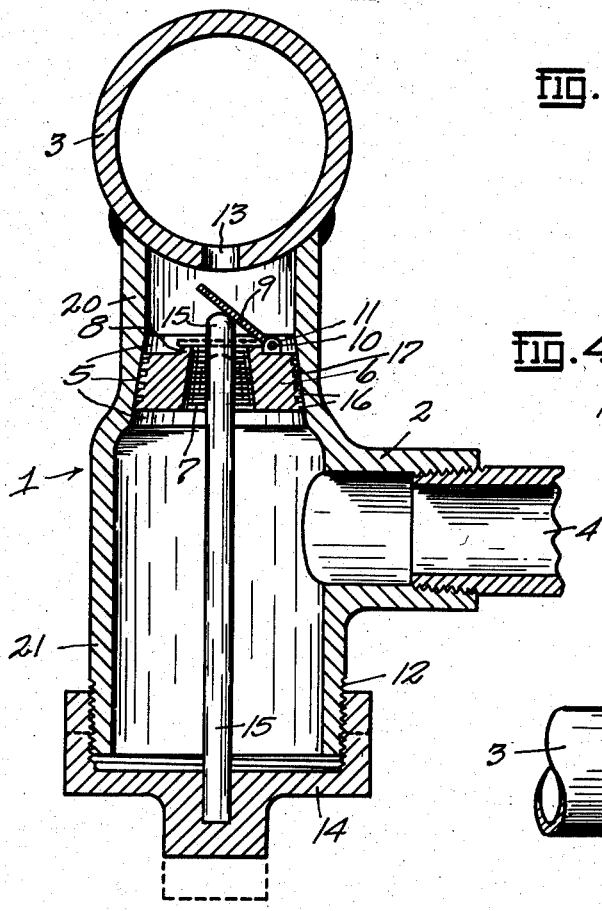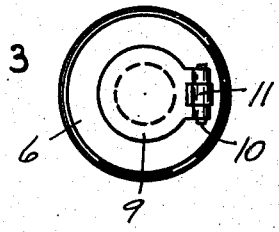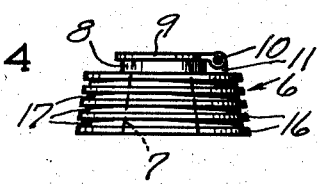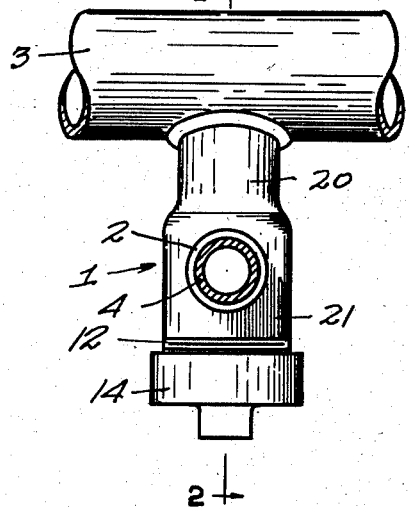

2,895,498

VALVED T-FITTING

Harry T. Waite, Jr., and Patterson D. Merrill, South Bend, Ind., assignors to M. B. Skinner Company, South Bend, Ind., a corporation of Indiana Application January 3, 1956, Serial No. 557,001

6 Claims. (Cl. 137—320)

This invention relates to improvements in valved T-fittings, and more particularly to a device of the character adapted to accommodate ready connection of a branch line to a conduit.

The primary object of the invention is to provide a device of this character which is simple in construction, easy to employ and install, and which has a high factor of safety in use in that it avoids leakage during manipulation thereof to effect a tapped connection with a pipe line and to seal the various joints.

A further object is to provide a fitting of this character having a passage therethrough from which a branch connector extends and which is provided with a valve in the first passage seated between the branch connector and the main, and responsive to pressure to assume a closed position, said passage having an end seal, including a projection cooperating with said valve to hold said valve open when the seal is closed and to permit said valve to close when the seal is removed.

Other objects will be apparent from the following specification.

In the drawing:

Fig. 1 is a view of the device in side elevation;

Fig. 2 is an axial sectional view of the device taken on line 2—2 of Fig. 1, and illustrating one position of the parts in full lines and a second position of the parts in dotted lines;

Fig. 3 is a top plan view of a valve element of the device; and

Fig. 4 is a side view of the valve element of the device.

Referring to the drawing which illustrates the preferred embodiment of the invention, the numeral 1 designates a tubular body or housing open at both ends thereof. One end portion 20 of the housing, shown uppermost but normally positioned lowermost in use, is preferably of slightly smaller cross-sectional shape than the opposite end 21 thereof and preferably has its end surface curved to conform with the exterior curved surface of a pipe main 3 which is to be tapped. Intermediate the ends of the part 1 is formed an integral branch tube 2 or neck whose bore communicates with the bore or interior of the tubular part 1. Neck 2 may be interiorly screw-threaded or otherwise formed to accommodate connection or joining of a branch pipe 4 therewith. The housing parts 1 and 2 define a T-fitting with branch part 2 preferably projecting from the large dimension portion 21 of the housing 1. The housing 1 is preferably secured to the pipe 3 by welding continuously therearound, said housing 1 preferably being located in a substantially upright position and projecting above the main pipe 3, although it may extend in any radial direction from pipe 3.

A portion of the bore of the body 1 between the branch 2 and the end thereof connected to the main 3 is tapered at 5. The tapered portion 5 is accurately machined and the taper thereof is small in degree or extent, for example, from one to three degrees.

A valve member is mounted in the housing 1 and includes an annular body member 6 whose external surface is tapered in conformity with the taper of the body bore at 5 and is adapted to have a tight driving fit in the bore 5 to anchor the same in the housing and at the same time insure a positive fluid-tight seal between the same and the housing. The bore 7 of the valve body 6 is preferably tapered, as shown, with its large diameter end located adjacent to the branch 2. An annular rib 8 projects from the body 6 at the small diameter end of the bore 7 and has a smooth end surface defining a valve seat encircling the bore 7 and spaced from the inner surface of the housing 1. A valve disk or plate 9 of a size slightly larger than the valve seat 8 is adapted to bear flat thereagainst in sealing relation thereto. The valve plate 9 has one or more ears projecting radially therefrom and pivotally connected by a hinge pin 10 with one or more projections 11 formed upon the annular valve body 6 outwardly of the valve seat 8. The pivot connection of the disk 9 with the valve body 6 will preferably be sufficiently free or loose to enable the valve disk 9 to bear flat and continuously against the valve seat 8 for sealing purposes in response to fluid pressure from the main 3.

The valve 6—10 will be so located and mounted that the valve disk 9 may assume fully open position to accommodate passage of a member, such as a drill, through the bore 7 without interference therewith. For this purpose the size of plate 9 will be so related to the size of the bore of the body 1 as to permit substantially parallel relation between the valve 9 in its fully open position and the axis of the bore 7. However, we prefer to so relate the size of the disk 9 and the spacing of its pivot 10 from the axis of housing 1 with respect to the diameter of the bore of the housing as to effect a limit to the opening movement somewhat short of true parallel relation between the plate and the axis of the bore so as to prevent the assumption by the plate of a dead center or over-center position when the device is positioned as shown in Figs. 1 and 2. The valve body member 6 is so located in the housing 1 as to insure that the full range of movement of the valve disk 9 may occur without contacting or interference with the pipe main 3.

The free end of the housing 1 is screw-threaded at 12 to provide anchorage for the housing or mounting portion of a drilling machine (not shown) by means of which a bore 13 may be drilled in the pipe main 3 after the housing 1 has been welded to the main 3 and the branch pipe 4 has been connected at the branch outlet 2. The valve body 6 will be mounted in place prior to the drilling operation, and the valve disk 9 will be unseated from the valve to accommodate passage of the drill through the bore 7 and into cutting engagement with the pipe main 3. Upon withdrawal of the drill the valve disk 9 is forced to seated or sealed position by the action of fluid pressure discharging from the main 3 through the aperture 13. The seating of the valve disk 9 permits withdrawal of the drilling machine and mounting of a sealing cap 14 to seal the open or free end of the housing 1. The cap 14 preferably has a substantially axial socket in its inner surface in which is screw-threaded or otherwise mounted fixedly one end of elongated rod 15 which is rigid and of a diameter substantially less than the diameter of the passage 7 of the valve seat 6. The member 15 will be of such a length that it extends into the bore 7 and, as the threading of the cap 14 upon the end 12 of the body commences, terminates clear of the valve disk 9 but is located adjacent thereto. The length of the screw-threaded connection of the cap 14 with the threaded part 12 of the body will be sufficient, however, so as to insure that the free end of the part 15 will engage and unseat the valve disk 9 and thereby hold open the valve against the fluid pressure acting thereon. Thus by the time a substantial seal is effected by the cap 14, opening of the valve will commence and the final sealing action of the housing by the cap 14 will occur coincident to opening of the valve disk.

It will be observed that if it is ever necessary to secure access to the interior of the housing 1 for any purpose by removing of the cap 14, the removal of that cap withdraws rod 15 to permit closing of the valve disc 9, so that, by the time the cap is released for removal, the valve disk 9 will have fully seated in response to fluid pressure from the pipe 3 to substantially seal the bore 7 of the valve body 6 to prevent flow of fluid from the main therethrough. Thus, if it is desired to disconnect the branch line 4, this can be done by simply removing the cap 14, then removing the rod 15 from the cap 14, reapplying the cap 14 or a new plain cap to the housing, and applying a closure (not shown) at the free end of the neck 2 after disconnecting the branch 4 therefrom. All of the parts remain in their properly centered relation and thereafter, if reuse of the branch 4 should be desired, all that is required is to reconnect the branch 4 to the neck 2 after removing the neck closure, remove the cap 14, again apply rod 15, and then reapply the cap 14 to the housing 1.

The bore 7 of the valve 6 is preferably internally screw-threaded so that a sealing plug (not shown) may be inserted therein at any time that the branch service is to be disconnected. Such a plug supplements the sealing action of the flat plate 9 and positively insures, in conjunction with the drive fit of the valve body 6 in the housing, that fluid cannot leak through the housing 1 past the valve. The plug, in conjunction with the valve disk, is particularly well suited to maintain a seal in any condition where the disk is likely to be subject to vibration, to variations of gas pressure, or to other conditions which might induce jarring of the valve disk with resultant occurrence of leakage.

The exterior surface of the annular valve body 6 may be smooth and conical or may be provided with a plurality of spaced narrow integral circumferential ribs 16 separated by shallow grooves 17 of a depth substantially equal to the width of the ribs. The general taper of the outline or overall shape of the valve body 6 is retained. This ribbed construction makes possible snug sealing fit of the valve body 6 in the tapered bore 5 even if irregularities occur in said bore. Thus, if a small irregularity exists in the bore, it is engaged only by one or a few ribs which can yield to accommodate it, without destroying continuous sealing contact of the other ribs within the bore. Also, the ribs can yield or flex axially incident to driving pressure, thus assuming a position requiring opposite flexing thereof in order to return to normal or planar position to release them. Thus, the ribbed construction improves the sealing function and the anchorage of valve body 6, compared to that secured by a plain tapered valve body 6.

While the preferred embodiment of the device has been illustrated and described, it will be understood that changes in the construction may be made within the scope of the appended claims without departing from the spirit of the invention.

We claim:

1. A valved T-fitting adapted for connection by welding to a pipe to be tapped, comprising a tube threaded at one end and having its other end serving as an inlet end, a branch tube projecting from and communicating with said first tube intermediate the ends of said first tube, a valve assembly mounted in said first tube between said branch tube and said inlet end, said assembly including an annular member anchored in sealing engagement in said tube and defining a valve seat and a pressure responsive valve plate freely pivoted to said annular member at the side of said annular member nearest said inlet end to swing between sealing position and open position, a closure removably mounted on said threaded tube end, and a rod carried by and extending substantially axially of said closure and of a cross-sectional size to extend through said annular member with clearance, said rod being of a length to extend through said annular member and hold said valve plate unseated when said closure is fully advanced on the threaded end of said tube but to terminate spaced from said valve plate when said closure is at least partially retracted on the threaded end of said tube.

2. A valved T-fitting as defined in claim 1, wherein said tube has a tapered bore portion, said annular member having a substantially fluid-tight drive fit in said tapered bore portion.

3. A valved T-fitting as defined in claim 1, wherein said tube has a tapered bore portion and said annular valve member is similarly tapered and has a fluid sealing drive fit in said tapered bore portion.

4. A valved T-fitting as defined in claim 1, wherein said tube has a tapered bore portion and said annular valve member is similarly tapered and has a series of spaced external circumferential grooves, said annular member having a drive fit in said tapered bore portion.

5. A valved T-fitting as defined in claim 1, wherein said tube has a tapered bore portion and said annular valve member is similarly tapered and has an outer surface defined by a plurality of substantially similar and substantially equally spaced circumferential ribs, said ribs having a sealing drive fit in said tapered bore portion.

6. A valved T-fitting as defined in claim 1, wherein said tube has a tapered bore portion and said annular valve member is similarly tapered and has a series of similar substantially equally spaced circumferential grooves each of a depth substantially equal to the spacing between grooves whereby exterior ribs are formed which are adapted to flex incident to driving fit thereof in said tapered bore portion.

References Cited in the file of this patent

UNITED STATES PATENTS

| | | |
|---|---|---|
| 45,183 | Sexton | Nov. 22, 1864 |
| 754,963 | Bertram | Mar. 22, 1904 |
| 931,004 | Waterman | Aug. 10, 1909 |
| 1,079,663 | Raffensdorfer | Nov. 25, 1913 |
| 1,982,189 | Anderson | Nov. 27, 1934 |
| 2,281,781 | Merrill | May 5, 1942 |
| 2,471,880 | MacDonald | May 31, 1949 |

FOREIGN PATENTS

| | | |
|---|---|---|
| 345,765 | France | Dec. 15, 1904 |